United States Patent

Gallagher

[15] 3,640,436
[45] Feb. 8, 1972

[54] AEROSOL VALVE FOR USE IN HIGH-RATE PRESSURE FILLING OF A CONTAINER

[72] Inventor: Frederick James Gallagher, 89, Balmoral Drive, Hayes Middlesex, England

[22] Filed: Jan. 14, 1970

[21] Appl. No.: 2,716

[30] Foreign Application Priority Data

Jan. 17, 1969    Great Britain.....................2,915/69

[52] U.S. Cl......................................................222/402.24
[51] Int. Cl.................................................B65d 83/14
[58] Field of Search.............222/402.24, 402.16, 394, 402.2, 222/402

[56] References Cited

UNITED STATES PATENTS

| | | | |
|---|---|---|---|
| 3,003,662 | 10/1961 | Meshberg | 222/402.2 X |
| 3,160,182 | 12/1964 | O'Donnell | 222/402.16 X |
| 3,219,069 | 11/1965 | Kuffer | 222/402.16 X |

*Primary Examiner*—Stanley H. Tollberg
*Attorney*—Lawrence E. Laubscher

[57] ABSTRACT

An aerosol valve has a housing with a main flow passage at its inner end and an annular seal at its outer end. A valve stem extends through the seal and is movable inwards against a coil spring to open the valve in normal use, and to permit pressure filling by inward deflection of the seal. The internal cross section of the housing over a substantial part of its length is square and flow channels extend from corners of the square through the housing around the outside of the coil spring. Specific characteristics of the seal and spring are stated.

3 Claims, 2 Drawing Figures

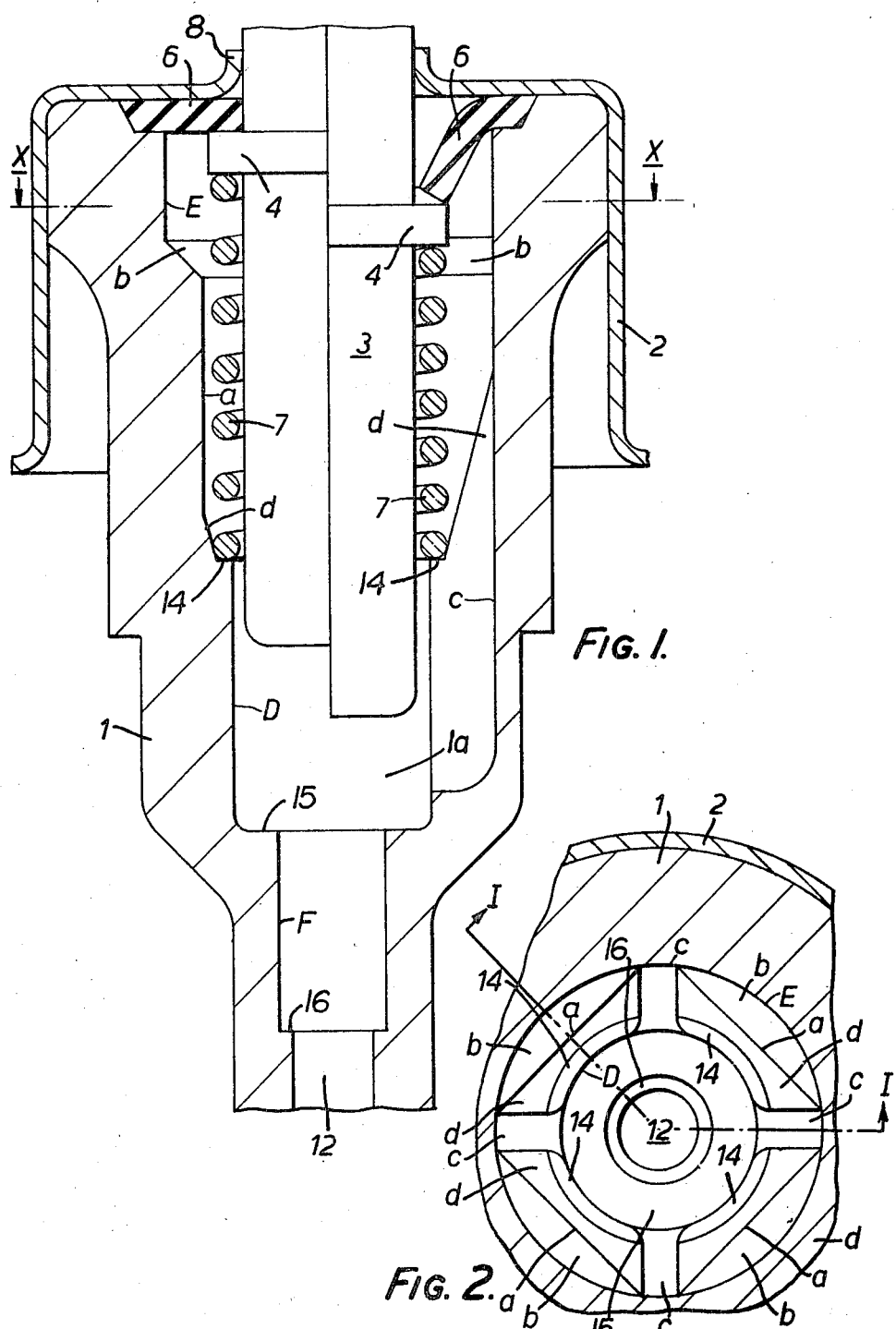

AEROSOL VALVE FOR USE IN HIGH-RATE PRESSURE FILLING OF A CONTAINER

This invention relates to aerosol valves (for pressurized containers) of the type constructed to permit pressure filling of containers on which the valves are mounted.

Such valves usually comprise an annular, elastomeric rubber or synthetic rubber) seal mounted at the outer end of a valve housing, a valve stem slidable through the seal and a coil compression spring within the housing which urges the stem into sealing engagement with the seal. The stem is depressed, against the spring, for normal use of the valve, and also for pressure filling. In the latter case, fluent material under pressure is supplied to the outer surface of the seal, so that the inner peripheral margin thereof deflects inwardly to create an annular flow passage between the seal and the stem. The pressurized material then flows through the housing to a main flow passage at the inner end of the housing, leading to the interior of the container.

There are two main factors affecting the rate at which filling can be effected. One of these is the available cross-sectional flow area of the housing, and the other is the area of the flow path which can be created by deflecting the seal.

As to the first of these factors, the problem facing the designer of such valves is to balance the conflicting requirements between, on the one hand, a large cross section flow path and on the other hand, economic consideration of overall unit cost, and ease of production. The first requirement could easily be met by providing a valve housing of substantial overall size, but this is objectionable because of the space which the valve would then consume in the container, and cost of each valve housing, since the major factor in this connection is the weight of material required to make the valve housing. These aerosol valves are, of course, only manufactured on a mass-production basis, the housing in particular being formed by injection moulding of synthetic plastic materials, hence the close relationship between weight of material and cost.

The designer also has to take into account the need to provide adequate lateral support for the coil spring and the expedient most commonly provided heretofore is to give the valve housing a generally circular cross section, with inwardly projecting radial vanes which support the coil spring and define between them flow passages for the material. A major disadvantage of this design is that the production of such housings by moulding requires the use of a core pin having deep narrow slots along it (to correspond with the radial vanes) and this results in the core pins being vulnerable to mechanical damage, to an increased moulding time (due to the difficult material flow into narrow slots and also greater care required in stripping the articles from the moulding tools) and to a fairly high rate of components being rejected because of imperfections, such as air bubble inclusions in the radial vanes.

The present invention aims at eliminating or reducing some of these difficulties and provides an aerosol valve comprising a valve housing having a main flow passage at its inner end, an annular, elastomeric seal at the outer end of the housing, and having its outer peripheral margin sealed to the housing, a central valve stem extending slidably through the seal and a coil compression spring contained within the housing and acting on the valve stem to urge it outwardly into sealing engagement with the seal. The stem being movable inwardly to operate the valve in normal use and to permit pressure filling by inward deflection of the inner peripheral margin of the seal, wherein the internal cross section of the housing over a substantial portion intermediate the inner and outer ends thereof is substantially square, with flow channels provided at the corners of the square for the flow of material through the housing around the out side of the coil compression spring.

As to the second of the two main factors referred to above, from the point of view of facilitating pressure filling, it would obviously be advantageous to make the seal as pliable as possible to obtain large seal deflections and a correspondingly large cross section flow path. However, these requirements are in conflict with those for normal use of a filled container in which the seal is required to close the container against pressure loss for extended periods between intermittent discharges of small quantities of the material.

In accordance with a further feature of the invention, these conflicting requirements are carefully balanced by appropriate dimensioning of the seal and selection of the seal material, and in accordance with a preferred feature of the invention, the said seal is from 0.030 inch to 0.050 inch thick, its supported diameter is 0.230 inch to 0.270 inch, its internal diameter 0.080 inch to 0.125 inch and is of a rubber or rubberlike material have a Shore hardness of 55°–80° IRHD.

In accordance with a further preferred feature the spring loading of the valve in the closed position is from 2 to 5 pounds, with a spring of 0.330 inch to 0.430 inch and the stem movement from the closed position for pressure filling is 0.050 inch to 0.120 inch.

One form of aerosol valve in accordance with the invention will now be described, by way of example only, with reference to the accompanying drawings, in which;

FIG. 1 is a sectional view taken along line I—I of FIG. 2, the left and right hand portions of the valve stem being schematically illustrated in the closed and open filling positions, respectively; and FIG. 2 is a section of the housing taken on the line X—X of FIG. 1.

The valve shown comprises a valve housing containing a chamber (a) said housing being mounted in the usual sheet metal ferrule or mounting cup 2 and receiving a central valve stem 3 having a collar 4 normally engaging the inner surface of a rubber or synthetic rubber valve seal 6 under the action of a valve spring 7. The ferrule 2 has a central, upstanding flange 8 surrounding the stem 3 with annular clearance, and the ferrule is locally deformed by crimping to form a secure assembly of the ferrule, housing and valve seal.

In use, the valve is operated in known manner by depressing the valve stem. Pressure filling is effected, also in known manner, by depressing the valve stem 3, so that the seal is no longer supported on its inner surface by the collar 4, and supplying material under pressure to the annular clearance between the stem 3 and the flange 8. The material acts on the radially inner peripheral margin of the seal, deflecting it inwardly to create a flow path between the seal and the stem for entry of the material into the valve housing 1, and so to the interior of the container. The valve housing 1 contains a valve chamber 1a having a cylindrical upper chamber portion E, an intermediate chamber portion of square cross-sectional configuration, and a cylindrical lower portion D that communicates with the inlet 12. The diameters of the upper and lower chamber portions are greater and smaller, respectively, than the spacing distance between opposed pairs of the longitudinally extending sidewalls $a$ of said intermediate chamber portion. The upper edges of the sidewalls $a$ are connected with the cylindrical wall of the chamber E by the four diverging walls $b$, and the lower edges of the sidewalls $a$ are connected with the annular transverse bottom wall 14 of the intermediate chamber portion by four converging walls $d$. The bottom wall 15 of lower chamber D is counterbored to define a smaller chamber F the bottom wall 16 of which contains the inlet opening 12.

The helical spring 7 that biases the valve stem to the closed position is seated at its lower end on the bottom wall 14 of the intermediate chamber, the outer diameter of the spring being generally equal to that of the annular bottom wall 14. The spring is arranged concentrically about the valve stem, the upper end of the spring being in engagement with the collar 4. In order to afford continuous communication between valve chamber portions E and D externally of the spring 7, the housing contains at each corner of the square intermediate chamber portion a longitudinal channel $c$ that extends from said intermediate chamber portion downwardly beyond said transverse bottom wall 14 toward the lower end of the lower chamber D. This configuration is designed to secure an adequate cross-sectional area for flow through the housing and past the spring 7 to cope with the flow rates permitted by the seal 6.

The seal 6 is 0.030 inch to 0.042 inch thick, its supported diameter (i.e., the smallest diameter at which it is supported by the housing) is 0.230 inch to 0.270 inch and its internal diameter is 0.080 inch to 0.125 inch, and the seal material has a Shore hardness of 55°–80° IRHD.

Preferably, the spring loading of the valve in the closed position is 2.0 to 5.0 pounds, with a spring length of 0.330 inch to 0.430 inch and a core movement (i.e., spring compression) of 0.050 inch to 0.120 inch.

This combination of dimensions and hardness has been found to give a very good filling rate without reducing the effectiveness of the seal in the normal conditions of intermittent use of the aerosol valve, with extended periods between uses.

I claim:

1. Aerosol valve means affording a high charging rate, comprising a valve housing (1) containing a valve chamber (1a) and inlet (12) and outlet openings communicating with the lower and upper ends of said valve chamber, said valve chamber including between its upper and lower ends over a substantial part of its length an intermediate portion having in transverse cross section a square configuration, said intermediate chamber portion including four identical longitudinally extending sidewalls a, four converging walls d connected with the lower edges of said sidewalls, and an annular transverse bottom wall (14) connected with the bottom edges of said converging walls, said bottom wall being counterbored to define a cylindrical lower portion (D) of said valve chamber in communication with said inlet, said housing containing at the upper end of said valve chamber an upper cylindrical portion (E) in communication with said outlet, said upper and lower chambers being colinearly arranged and having diameters that are greater and smaller, respectively, than the spacing distance between opposed pairs of said sidewalls of said intermediate chamber portion;

annular flexible seal means (6) connected with said housing to close said outlet opening, the bore in said seal means being colinear with said annular bottom wall;

a valve stem (3) slidably mounted in said seal bore for vertical movement relative to said housing, said valve stem including on its outer periphery an annular collar (4); and spring means (7) biasing said valve stem relative to said housing toward a closed position in which said collar is in sealed engagement with said seal means, said spring means including a helical spring arranged in said valve chamber concentrically about said valve stem, the lower end of said spring being seated on said transverse bottom wall and the upper end of said spring being in engagement with said collar, the outer diameters of said helical spring and said annular bottom wall being generally equal; said housing containing at each corner of said intermediate chamber a longitudinal channel (c) that extends from said intermediate chamber portion downwardly below said transverse bottom wall in the direction of the lower end of said lower chamber (D), whereby when said inlet opening is connected with a container to be charged and said outlet opening is connected with a source of charging material, said channels afford a high flow rate of the material from said upper chamber portion to said lower chamber portion externally of said spring means.

2. Aerosol valve means as defined in claim 1, wherein said seal means has a thickness of from 0.030 inch to 0.050 inch, a supported diameter of from 0.230 inch to 0.270 inch, and an internal diameter of from 0.080 inch to 0.125 inch, said seal means being formed of a rubberlike material having a Shore hardness of from 50° to 80° IRHD.

3. Aerosol valve means as defined in claim 2, wherein said valve stem is spring loaded to the closed position by a loading force of from 2 to 5 pounds, wherein said spring has a length of from 0.330 inch to 0.430 inch, and wherein the extent of movement of said stem from the closed position to the pressure filling position is from 0.50 inch to 0.120 inch.

* * * * *